United States Patent
Narula et al.

(10) Patent No.: US 12,225,081 B2
(45) Date of Patent: Feb. 11, 2025

(54) BEACON ORCHESTRATION FOR CONCURRENT COLLABORATION SESSIONS IN PEER-TO-PEER (P2P) OR MESH NETWORKS

(71) Applicant: Dell Products, L.P., Round Rock, TX (US)

(72) Inventors: Harpreet Narula, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 239 days.

(21) Appl. No.: 17/395,583

(22) Filed: Aug. 6, 2021

(65) Prior Publication Data

US 2023/0055342 A1 Feb. 23, 2023

(51) Int. Cl.
*H04L 67/104* (2022.01)
*H04L 67/1061* (2022.01)
*H04L 67/146* (2022.01)

(52) U.S. Cl.
CPC ...... *H04L 67/1059* (2013.01); *H04L 67/1044* (2013.01); *H04L 67/1065* (2013.01); *H04L 67/146* (2013.01)

(58) Field of Classification Search
CPC ............. H04L 67/1059; H04L 67/1044; H04L 67/1065; H04L 67/146
See application file for complete search history.

(56) References Cited

U.S. PATENT DOCUMENTS

| | | | |
|---|---|---|---|
| 9,877,266 B1* | 1/2018 | Knas | H04W 4/04 |
| 11,323,493 B1* | 5/2022 | Xi | H04M 3/42348 |
| 2003/0012215 A1* | 1/2003 | Novaes | H04L 45/484 |
| | | | 370/432 |
| 2003/0135552 A1* | 7/2003 | Blackstock | H04L 67/1068 |
| | | | 709/205 |
| 2008/0298329 A1* | 12/2008 | Mo | H04W 84/18 |
| | | | 370/350 |
| 2018/0302923 A1* | 10/2018 | Patil | H04W 74/008 |
| 2018/0343547 A1* | 11/2018 | Chaki | H04L 67/1068 |
| 2020/0287763 A1* | 9/2020 | Bhanage | H04L 27/2607 |
| 2021/0058981 A1* | 2/2021 | Asterjadhi | H04W 16/14 |
| 2021/0168795 A1* | 6/2021 | Yang | H04L 5/0048 |
| 2023/0032159 A1* | 2/2023 | Kalinichenko | H04L 65/4015 |

* cited by examiner

*Primary Examiner* — Nam T Tran
(74) *Attorney, Agent, or Firm* — Fogarty LLP

(57) ABSTRACT

Systems and methods for beacon orchestration for concurrent collaboration sessions in peer-to-peer (P2P) or mesh networks are described. In some embodiments, an Information Handling System (IHS) may include a processor and a memory coupled to the processor, the memory having program instructions stored thereon that, upon execution, cause the IHS to: detect a first multicast collaboration beacon (MCB) in a P2P or mesh network comprising two or more IHSs; identify a first collaboration session between the two or more IHSs based upon the first MCB; and transmit a second MCB configured, based at least in part upon the first MCB, to orchestrate a second collaboration session in the P2P or mesh network.

17 Claims, 10 Drawing Sheets

502

| ELEMENT ID | LENGTH | DTIM COUNT | DTIM PERIOD | BITMAP CONTROL | | PARTIAL VIRTUAL BITMAP |
|---|---|---|---|---|---|---|
| | | | | OFFSET | BROADCAST | |

601

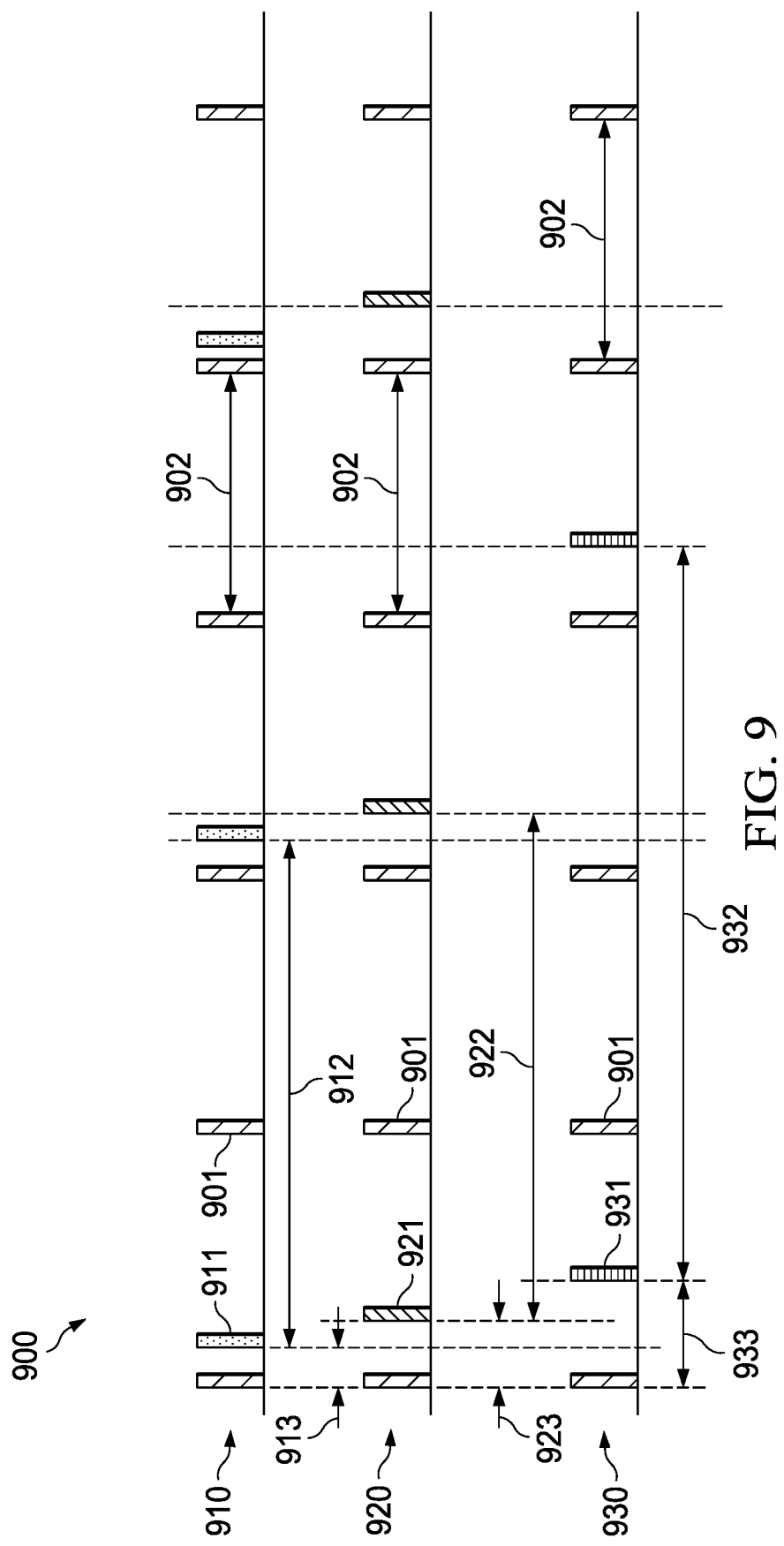

BEACON ORCHESTRATION FOR CONCURRENT COLLABORATION SESSIONS IN PEER-TO-PEER (P2P) OR MESH NETWORKS

FIELD

This disclosure relates generally to Information Handling Systems (IHSs), and more specifically, to systems and methods for beacon orchestration for concurrent collaboration sessions in peer-to-peer (P2P) or mesh networks.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate with each other through networks to perform processing tasks. In an IHS network based on the client-server model, individual clients request services and resources from centralized servers. Conversely, in a peer-to-peer (P2P) or mesh network, interconnected IHSs ("peers") share resources amongst each other without the need for a centralized administrative system.

In a Wi-Fi (IEEE 802.11) P2P or mesh network, for example, multiple IHS may be co-located. Each IHS may periodically broadcast and receive control messages known as "beacon frames," which serve as a network discovery mechanism. These control messages are normally sent at a fixed time interval. As the inventors hereof have recognized, however, when random beacon frames are present on the same wireless channel, collision of beacons transmitted by different IHSs may persistently occur, sometimes indefinitely, especially when those IHSs are made by the same manufacturer.

Moreover, the inventors hereof have also recognized that beacon collisions can become even more concerning in P2P or mesh networks when multiple communication or collaboration sessions are taking place concurrently. To address these, and other issues, systems and methods described herein may intelligently orchestrate and/or schedule beacons in P2P or mesh networks.

SUMMARY

Embodiments of systems and methods for beacon orchestration for concurrent collaboration sessions in peer-to-peer (P2P) or mesh networks are described. In an illustrative, non-limiting embodiment, an Information Handling System (IHS) may include a processor and a memory coupled to the processor, the memory having program instructions stored thereon that, upon execution, cause the IHS to: detect a first multicast collaboration beacon (MCB) in a P2P or mesh network comprising two or more IHSs; identify a first collaboration session between the two or more IHSs based upon the first MCB; and transmit a second MCB configured, based at least in part upon the first MCB, to orchestrate a second collaboration session in the P2P or mesh network.

The first MCB may include first capability information associated with at least one of the two or more IHSs, and wherein the second MCB may include second capability information associated with the IHS. Additionally, or alternatively, the first MCB may include a first bitmap offset in a first Traffic Indication Map (TIM), and wherein the second MCB may include a second bitmap offset in a second TIM.

The second bitmap offset may be greater than the first bitmap offset. A difference between the second bitmap offset and the first bitmap offset may be selected based upon contextual information.

The contextual information may include at least one of: a number of collaboration sessions; a number of IHSs participating in a given collaboration session, an identification of an application used during the given collaboration session, a priority of the given collaboration session, or a level of service required or requested by the given collaboration session. Additionally, or alternatively, the contextual information may include at least one of: a proximity of a user to the IHS, a location of the IHS, or a posture of the IHS.

The the first MCB may be received over a first communication channel associated with a first collaboration session identification, and the second MCB may be configured to be transmitted over a second communication channel selected based upon a second collaboration session identification. A second frequency of the second communication channel may be higher than a first frequency of the first communication channel.

The first MCB may include a first Basic Service Set (BSS) color indication selected based upon the first collaboration session identification, and the second MCB may include a second BSS color indication selected based upon the second collaboration session identification. Each of the first and second collaboration sessions may include execution of at least one of: an audio fusion application or service; or a screen share application or service.

The second MCB may be configured to, upon receipt by a second IHS, enable the second IHS to join the second collaboration session with the IHS in the P2P or mesh network. The second MCB may also be configured to, upon receipt by a second IHS, enable the second IHS to broadcast another MCB configured to orchestrate the second collaboration session in the P2P or mesh network.

The first MCB may include a first primary bitmap offset in a first Traffic Indication Map (TIM), the second MCB may include a second primary bitmap offset in a second TIM, the other MCB may include a first secondary bitmap offset in another TIM, and the first secondary bitmap offset may have a value between the first and second primary bitmap offsets.

A difference between the first secondary bitmap offset and the first primary bitmap offset may be selected based upon contextual information. The contextual information may include at least one of: a number of IHSs participating in the second collaboration session, an identification of the second collaboration session, a priority of the second collaboration session, or a level of service required or requested by the second collaboration session. Additionally, or alternatively, the contextual information may include at least one of: a distance of a user to the IHS, a location of the IHS, or a posture of the IHS.

The program instructions, upon execution, further cause the IHS to: reduce the difference in response to at least one of: the distance being a first distance, the location being a first location, or the posture being a first posture; or increase the difference in response to at least one of: the distance being a second distance, the location being a second location, or the posture being a second posture.

In another illustrative, non-limiting embodiment, a memory device may have program instructions stored thereon that, upon execution by a processor of an IHS, cause the IHS to: receive, by a MBTS service, a MCB in a P2P or mesh network; and identify, by the MBTS service based upon the MCB, an identification of an application used in a collaboration session taking place in the P2P or mesh network.

In yet another illustrative, non-limiting embodiment, a method may include: receiving MCBs broadcast in a peer-to-peer P2P or mesh network, each MCB associated with a different collaboration session; and joining a selected one of the different collaboration sessions using a BSS color indication contained in at least one of the MBCs.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 9 shows an example of an implementation of systems and methods for beacon orchestration for concurrent collaboration sessions in P2P or mesh networks, according to some embodiments.

DETAILED DESCRIPTION

Figure 1:
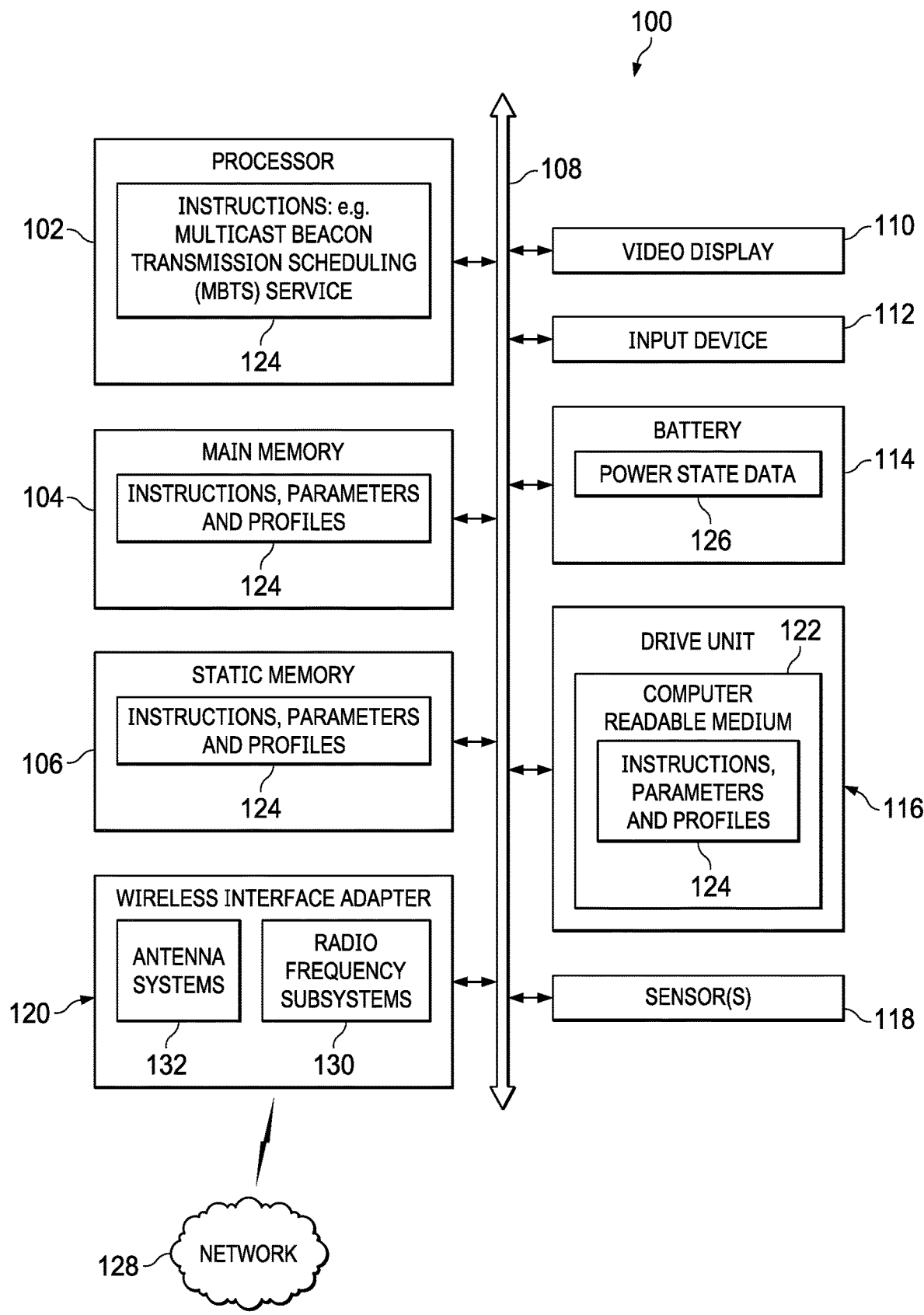
FIG. 1 is block diagram of an example of components of an Information Handling System (IHS) configured to implement beacon orchestration for concurrent collaboration sessions in peer-to-peer (P2P) or mesh networks, according to some embodiments.

As used herein, the term "P2P" generally refers to computing or networking environments that follow a distributed application architecture which partitions tasks or workloads between peers (e.g., Information Handling Systems or "IHSs"). Peers can be equally privileged participants forming a network of nodes. Peers can also make a portion of their resources, such as processing power, disk storage, or network bandwidth, directly available to other peers, without central coordination by a server. In a P2P network, peers can be both suppliers and consumers of resources, in contrast to the traditional client-server model in which the consumption and supply of resources is divided.

The term "mesh network" refers to a local network topology in which infrastructure nodes (e.g., access points, etc.) connect directly, dynamically, and non-hierarchically to as many other infrastructure nodes as possible and cooperate with each another to route data from/to devices efficiently.

In a collaboration room, wireless connectivity among a plurality of co-located IHSs may be established using one or more P2P or multi-mesh networks. A plurality of collaboration workspace or sessions, each supported by a corresponding P2P or mesh network, may execute applications that enable certain activity among participating IHSs.

In an example, an "audio fusion" application may define a group of microphones in a room that enhances the overall user experience by allowing all participants of a collaboration workspace or session to use their IHSs' microphones: audio from each microphone may be captured, processed, fused, and sent over as a single voice. In another example, a "screen share" application may enable any participant of a collaboration workspace or session to share a portion of their display, application window, or desktop to any other participant. In yet another example, P2P and mesh networks may be used to create Augmented Reality (AR)/Virtual Reality (VR) or low-latency gaming hubs, or the like.

Each IHS participating in a collaboration workspace or session may use a Wi-Fi (IEEE 802.11) P2P (e.g., Wi-Fi Direct, etc.) or mesh network for data traffic. To establish such a P2P or mesh network, an IHS may periodically broadcast and receive control messages known as "beacon frames," which serve as a discovery mechanism other co-located IHSs are capable of scanning an identifying. These control messages are normally sent at a fixed time interval. When different beacon frames are present on the same wireless channel in the same room, however, collision of beacons transmitted by different IHSs may persistently occur, sometimes indefinitely, especially when those IHSs are made by the same manufacturer.

To address these, and other concerns, systems and methods for beacon orchestration for concurrent collaboration sessions in P2P or mesh networks deployed in a collaboration room are described. For example, in various implementations, these systems and methods may provide a de-centralized Wi-Fi beacon frame scheduler for a multi-mesh workspace where any IHS may participate in a distinct collaboration session with any other IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is block diagram of an example of components of an Information Handling System (IHS) configured to implement beacon orchestration for concurrent collaboration sessions in P2P or mesh networks. In some embodiments, IHS 100 may represent wireless communication devices 210, 220, and 230 and/or servers or systems 290, located anywhere within network 200 of FIG. 2, including remote data center 286.

In some cases, IHS 100 may represent a wireless communication device (e.g., a phone, a tablet, a watch, a laptop, etc.) associated with a user or recipient of intended wireless communication. Moreover, IHS 100 may execute instructions via a processor for beacon orchestration for concurrent collaboration sessions in P2P or mesh networks including a Multicast Beacon Transmission Scheduling (MBTS) service. The MBTS may operate as a software agent, executed in whole or in part, by IHS 100.

As shown in FIG. 1, IHS 100 may include processor 102 such as a Central Processing Unit (CPU), a Graphics Processing Unit (GPU), or both. Moreover, IHS 100 can include main memory 104 and a static memory 106 that can communicate with each other via bus 108. As shown, IHS 100 may further include video display unit 110, such as a Liquid Crystal Display (LCD), an Organic Light Emitting Diode (OLED), a flat panel display, a solid-state display, or other type of display system. Display 110 may include a touch screen display module and touch screen controller for receiving user inputs. In some implementations, two displays may be coupled to each other via a hinge or the like.

Additionally, IHS 100 may include input device 112, such as a keyboard, and a cursor control device, such as a mouse or touchpad or similar peripheral input device. IHS 100 may also include a power source such battery 114 or an A/C power source. IHS 100 may also include disk drive unit 116 and sensor(s) 118. IHS 100 may include a network interface device such as wireless adapter 120. IHS 100 may also represent a server device whose resources can be shared by multiple client devices, or it can represent an individual client device, such as a desktop personal computer, a laptop computer, a tablet computer, or a mobile smartphone.

IHS 100 may include program instructions 124 that can be executed by processor 102 to cause the computer system to perform any one or more of the methods or operations disclosed herein. For example, instructions 124 may execute an MBTS service, agent, or component.

In some cases, instructions 124 may be executed for performing beacon orchestration for concurrent collaboration sessions in P2P or mesh networks. Various software modules comprising program instructions 124 may be coordinated by an Operating System (OS) via an Application Programming Interface (API). Examples of OSs may include WINDOWS, ANDROID, etc. Examples of APIs include, but are not limited to: Win 32, Core Java API, or Android APIs.

In a networked deployment, IHS 100 may operate in the capacity of a server or as a client user computer in a server-client user network environment, or as a peer computer system in a P2P, mesh, and/or distributed network environment. IHS 100 may also be implemented as or incorporated into various devices, such as a personal computer (PC), a tablet PC, a set-top box (STB), a personal digital assistant (PDA), a mobile IHS, a palmtop computer, a laptop computer, a desktop computer, a communications device, a wireless telephone, a land-line telephone, a control system, a camera, a scanner, a facsimile machine, a printer, a pager, a personal trusted device, a web appliance, an access point (AP), a network router, switch or bridge, or any other machine capable of executing a set of instructions (sequential or otherwise) that specifies actions to be taken by that machine.

Disk drive unit 116 may include computer-readable medium 122 in which one or more sets of instructions 124 such as software can be embedded. Similarly, main memory 104 and static memory 106 may also contain computer-readable medium for storage of one or more sets of instructions, parameters, or profiles 124. Disk drive unit 116 and static memory 106 also contain space for data storage. Further, instructions 124 may embody one or more of the methods or logic as described herein.

Wireless link quality or conditions may be monitored and measured by processor 102 during wireless link usage and stored. In a particular embodiment, instructions, parameters, and profiles 124 may reside completely, or at least partially, within main memory 104, static memory 106, and/or disk drive 116 during execution by processor 102. Main memory 104 and processor 102 may also include computer-readable media. Battery 114 may include a smart battery system that tracks and provides power state data 126. This power state data may be stored with instructions, parameters, and profiles 124.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency (RF) subsystems 130 with transmitter/receiver circuitry, wireless controller circuitry, amplifiers and other circuitry for wireless communications.

Each RF subsystem 130 may communicate with one or more wireless technology protocols. RF subsystem 130 may contain individual subscriber identity module (SIM) profiles for each technology service provider and their available protocols. Alternatively, it may have a software-based SIM profile that is reconfigurable, or an eSIM for electronic control over activate SIM profile being used. Wireless adapter 120 may also include antenna system 132 which may include tunable antenna systems.

In some cases, wireless adapter 120 may operate two or more wireless communication links. For example, wireless adapter 120 may operate the two or more wireless communication links with a single, shared communication frequency band such as with the 5G standard relating to unlicensed wireless spectrum for small cell 5G next gen operation or for unlicensed Wi-Fi WLAN operation. For instance, a 5 GHz wireless communication frequency band may be apportioned under the 5G standards for communication on either small cell WWAN wireless link operation or Wi-Fi WLAN operation. In another example, wireless adapter 120 may operate a wireless communication link or links in unlicensed spectrum in 4.5G using protocols such as Licensed Assisted Access (LAA) or enhanced LAA (eLAA). In some implementations, shared or aggregated wireless communication link(s) may be transmitted through one or a plurality of antennas.

In other cases, IHS 100 operating as a wireless communication device may operate a plurality of wireless adapters 120 for concurrent radio operation in one or more wireless communication bands. The plurality of wireless adapters 120 may further share a wireless communication band in some disclosed embodiments.

Wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Wireless adapter 120 may represent an add-in card, wireless network interface module that is integrated with a main board of IHS 100 or integrated with another wireless network interface capability, or any combination thereof.

In an embodiment, wireless adapter 120 may include one or more RF subsystems 130 including transmitters and wireless controllers for connecting via a multitude of wireless links. IHS 100 may have an antenna system transmitter 132 for 5G small cell WWAN, Wi-Fi WLAN or WiGig connectivity and one or more additional antenna system transmitters 132 for macro-cellular communication. RF subsystems 130 include wireless controllers to manage authentication, connectivity, communications, power levels for transmission, buffering, error correction, baseband processing, and other functions of wireless adapter 120.

RF subsystems 130 of wireless adapter 120 may measure various metrics relating to wireless communication pursuant to operation of a context aware radio resource management system. For example, the wireless controller of RF subsystem 130 may manage detecting and measuring received signal strength levels, bit error rates, signal to noise ratios, latencies, packet loss, congestion, contention, jitter, and other metrics or indicators relating to signal quality and strength. In an embodiment, a wireless controller may manage one or more RF subsystems 130 within wireless adapter 120.

The wireless controller also manages transmission power levels which directly affect RF subsystem power consumption. To detect and measure power consumption by RF subsystem 130, RF subsystem 130 may implement current and voltage measurements of power.

The wireless network may have a wireless mesh architecture in accordance with mesh networks described by the wireless data communications standards or similar standards. Wireless adapter 120 may also connect to the external network via a WPAN, WLAN, WWAN, or similar wireless switched Ethernet connection. The wireless data communication standards set forth protocols for communications and routing via APs, as well as protocols for a variety of other operations. Other operations may include handoff of client devices moving between nodes, self-organizing of routing operations, or self-healing architectures in case of interruption.

In accordance with various embodiments, a computer-readable medium may include instructions, parameters, and profiles 124 or it may receive and execute instructions, parameters, and profiles 124 responsive to a propagated signal; so that a device connected to network 128 can communicate voice, video, or data over the network 128. Further, program instructions 124 may be transmitted or received over the network 128 via the network interface device or wireless adapter 120.

IHS 100 includes one or more application programs 124, and Basic Input/Output System and firmware (BIOS/FW) code 124. BIOS/FW code 124 functions to initialize IHS 100 on power up, to launch an operating system, and to manage input and output interactions between the operating system and the other elements of IHS 100. In an embodiment, BIOS/FW code 124 reside in memory 104, and include machine-executable code that is executed by processor 102 to perform various functions of IHS 100. In another embodiment, application programs and BIOS/FW code reside in another storage medium of IHS 100.

For example, application programs and BIOS/FW code can reside in drive 116, in a ROM associated with IHS 100, in an option-ROM associated with various devices of IHS 100, in storage system 107, in a storage system associated with network channel of a wireless adapter 120, in another storage medium of IHS 100, or a combination thereof. Application programs 124 and BIOS/FW code 124 may each be implemented as single programs, or as separate programs carrying out the various operations described herein.

In some embodiments, a computer-readable medium may include a solid-state memory such as a memory card or other package that houses one or more non-volatile read-only memories. Further, a computer-readable medium may be a random-access memory or other volatile re-writable memory device. Additionally, a computer-readable medium may include a magneto-optical or optical medium, such as a disk or tapes or other storage device to store information received via carrier wave signals, such as a signal communicated over a transmission medium. Furthermore, a computer readable medium may store information received from distributed network resources such as from a cloud-based environment.

Sensors 118 may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration, bag state (in or out of a bag), and/or lid sensor(s) (open or closed). In some cases, one or more sensors 118 may be a part of a keyboard or other input device 112. Processor 102 may be configured to process information received from sensors 118 and to perform context-based network selection operations.

For instance, during operation, the user may open, close, flip, swivel, or rotate display 110 to produce different IHS postures. In some cases, processor 102 may be configured to determine a current posture of IHS 100 using sensors 118. For example, in a dual-display IHS implementation, when a first display 110 (in a first IHS portion) is folded against a second display 110 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait). For each posture and/or hinge angle, processor(s) 201 may perform a different context-based network selection operation.

For example, in a laptop posture, a first display surface of a first display 110 may be facing the user at an obtuse angle with respect to a second display surface of a second display 110 or a physical keyboard portion. In a tablet posture, a first display 110 may be at a straight angle with respect to a second display 110 or a physical keyboard portion. And, in a book posture, a first display 110 may have its back resting against the back of a second display 110 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

Processor 102 may also process user presence data received by sensors 118 to determine, for example, whether an IHS's end-user is present or absent. In situations where the end-user is present before IHS 100, processor 102 may further determine a distance of the end-user from IHS 100 continuously or at pre-determined time intervals. The detected or calculated distances may be used by processor 102 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 110.

More generally, in various implementations, processor 102 may receive IHS context information using sensors 118 including one or more of, for example: user's presence state (e.g., present, near-field, mid-field, far-field, absent), IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user is operating the keyboard is typing with one or two hands (e.g., holding a stylus, or the like), a time of day, software application(s) under execution in focus for receiving keyboard input, etc.

In various embodiments, IHS 100 may not include all of the components shown in FIG. 1. Additionally, or alternatively, IHS 100 may include components in addition to those shown in FIG. 1. Additionally, or alternatively, components represented as discrete in FIG. 1 may be integrated with other components. For example, all or a portion of the functionality provided by the illustrated components may be implemented in a System-on-Chip (SOC), or the like.

Figure 2:
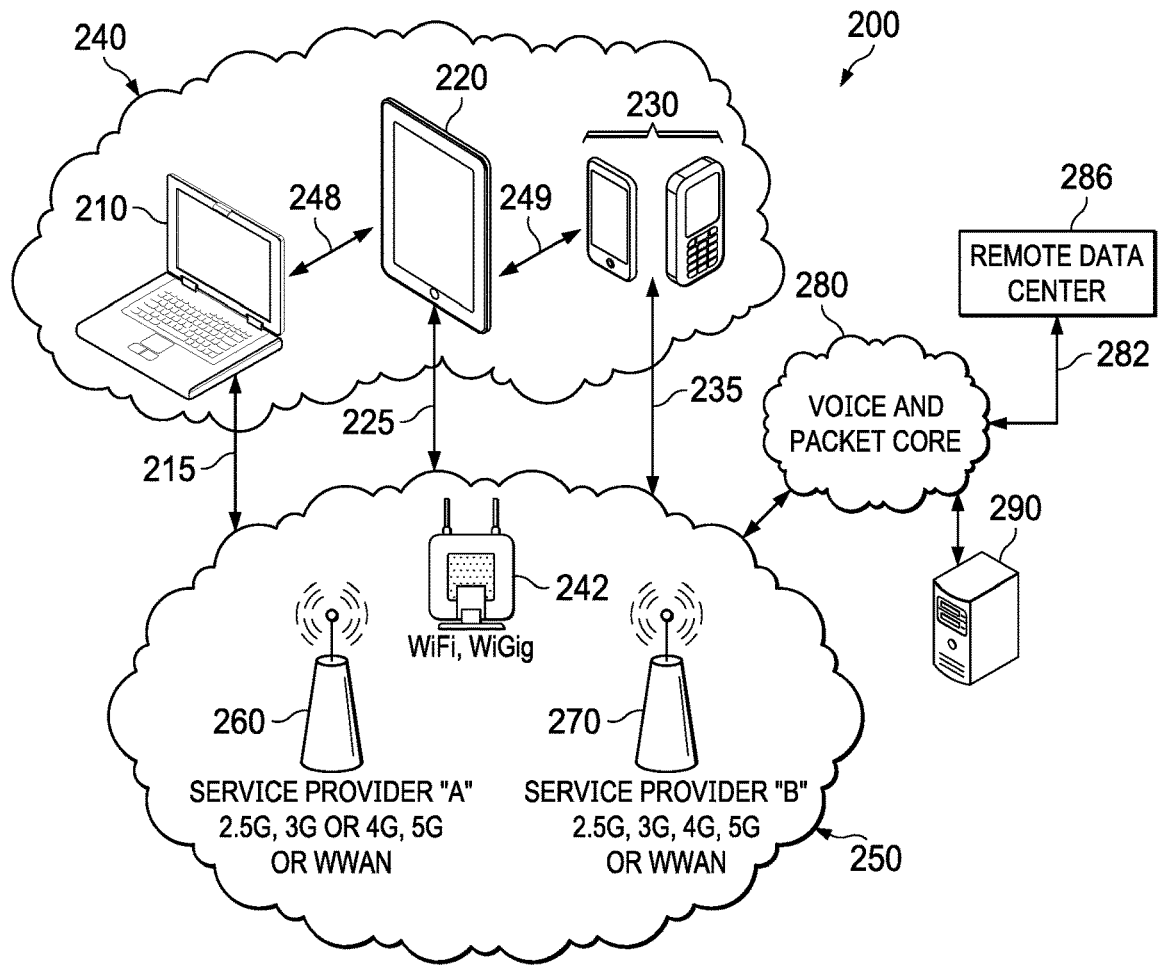
FIG. 2 is block diagram of a network environment where beacon orchestration for concurrent collaboration sessions in P2P or mesh networks may be implemented, according to some embodiments.

FIG. 2 is block diagram of network environment 200 where systems and methods for beacon orchestration for concurrent collaboration sessions in peer-to-peer (P2P) or mesh networks may be implemented. In some embodiments, network environment 200 may include networked wireless communication devices, wireless network APs, and multiple wireless connection link options. A variety of additional computing resources of environment 200 may include client mobile IHSs, data processing servers, network storage devices, local and wide area networks, or other resources.

As depicted, IHSs 210, 220, and 230 may be wireless communication devices such as laptop computers, tablets, or smartphones. IHSs 210, 220, and 230 may access wireless local network 240 via access point 242, and/or macro-cellular network 250 via service providers 260 and 270 (e.g., unlicensed WWAN small cell wireless links such as with small cell unlicensed LTE substations). In some cases, IHS 210, such as a laptop, may access local network 240 using a wired link, such as a wired Ethernet connection.

Wireless local network 240 may include a WLAN, WPAN, or WWAN provided by one or more access points (APs) 242 (or wireless bridges, switches, routers, etc.), which are part of infrastructure nodes 250. Additionally, or alternatively, other available wireless links within network environment 200 may include macro-cellular connections 215, 225, and/or 235 via one or more service providers 260 and 270.

Wireless communications across networks 240 and/or 250 may take place using standard protocols such as IEEE 802.11 Wi-Fi, IEEE 802.11ad WiGig, IEEE 802.15 WPAN, or emerging 5G small cell WWAN communications such as eNodeB, or other wireless network protocols. Service provider macro-cellular connections 215, 225, and/or 235 may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

Voice and packet core network 280 may contain externally accessible computing resources and connect to a remote data center 286. Voice and packet core network 280 may contain multiple intermediate web servers or other locations with accessible data. Voice and packet core network 280 may also connect to other wireless networks similar to 240 or 250 and additional IHSs. Connection 282 between network 250 and remote data center 286 or connection to other additional wireless networks may be via Ethernet or another similar connection to the world-wide-web, a WAN, a LAN, another WLAN, or other network structure. Remote data center 286 may include web servers or resources within a cloud environment. For example, remote data centers can include additional information handling systems, data processing servers, network storage devices, local and wide area networks, or other resources as needed or desired.

In some embodiments, IHSs 210, 220, or 230 may have a plurality of wireless network interface systems capable of transmitting simultaneously within a shared communication frequency band. Examples of communication frequency bands may include unlicensed 5 GHz frequency bands or 2.5 GHz conditional shared communication frequency bands under FCC Part 96. Wi-Fi ISM frequency bands that may be subject to future sharing include 2.4 GHz, 60 GHz, 900 MHz or similar bands.

Access point(s) 242 supporting local Wi-Fi network 240 may be connected to IHSs 210, 220, and/or 230. Alternatively, IHSs 210, 220, and/or 230 may connect to external network 280 via base station locations such as service providers 260 and/or 270.

In various embodiments, IHSs 210, 220, and/or 230 may communicate directly with each other using intra-device via links 248 and/or 249, for instance, when configured to operate as a peer node in a P2P or mesh network. In this example, a first collaboration workspace or session may be established between IHS 210 and 220 via first P2P or mesh connection 248, and a second collaboration workspace or session may be established between IHS 220 and 230 via second P2P or mesh connection 249. More generally, however, any number of P2P or mesh links 248 and/or 249 may be established between any number of co-located IHSs 210, 220, and 230 to create and maintain concurrent collaboration workspaces or sessions in network environment 200.

Figure 3:
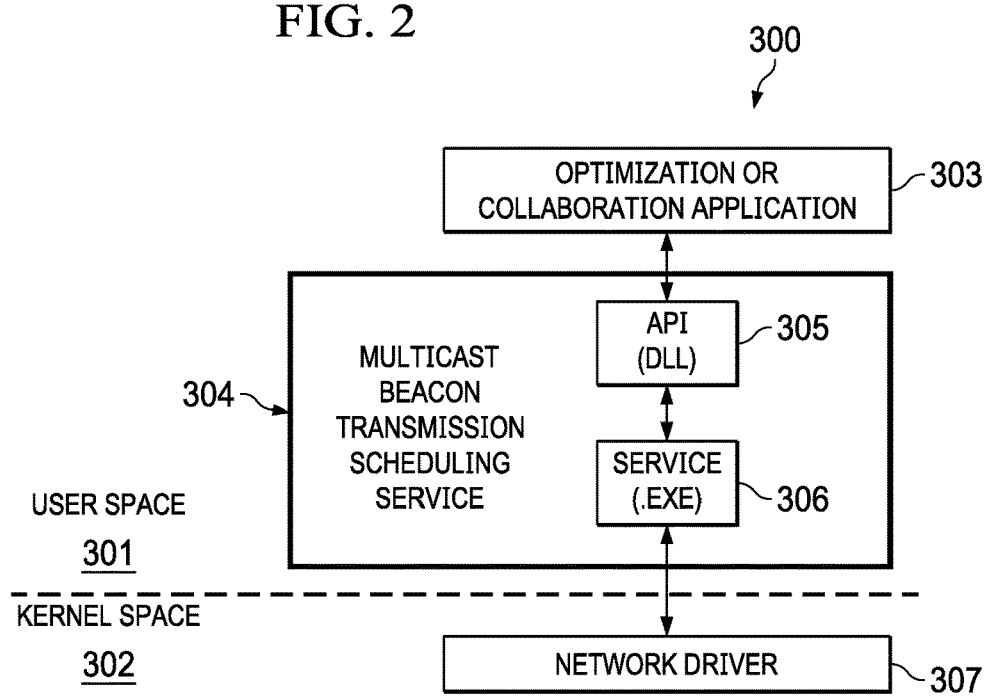
FIG. 3 is a block diagram of software modules configured to implement beacon orchestration for concurrent collaboration sessions in P2P or mesh networks, according to some embodiments.

FIG. 3 is a block diagram of software 300 configured to implement beacon orchestration for concurrent collaboration sessions in P2P or mesh networks. In some embodiments, software 300 may be instantiated through the execution of program instructions 124 by processor 102 of IHS 100 (e.g., implemented as IHSs 210, 220, and 230 in FIG. 2). In operation, software 300 may be configured to execute one or more operations of method 800 shown in FIGS. 8A-C.

As shown, optimization or collaboration application 303 may provide a graphical UI (GUI) in user space 301 configured to receive one or more selections or commands from a user. Moreover, optimization or collaboration application 303 may transmit, as one or more configuration parameters, a user's selection of a collaboration service, session, workspace, application and/or other context information, which in turn may be usable by MBTS service 304 to determine when to enable, disable, and/or how to configure beacon orchestration operations in IHS 100, as in method 800.

Optimization or collaboration application 303 passes configuration parameters to MBTS service 304, which includes API portion 305 (e.g., a dynamic-link library or DLL, etc.) and OS service portion 306 (e.g., an executable). In some implementations, OS service portion 306 may be configured to handle beacon orchestration operations in user space 301. In kernel space 302, network driver 307 (e.g., Windows Filtering Platform (WFP)) may be configured to perform beacon orchestration for concurrent collaboration sessions under control of OS service portion 306 of MBTS service 304 as configured by optimization or collaboration application 303.

In some implementations, software 300 may obtain real-time link requirements from running collaboration applications of various types, such as, for example, gaming, video streaming, audio conferencing, video conferencing, etc., as all as other contextual information, and it may feed that data to OS service portion 306 of MBTS 304. MBTS 304 then uses the data to improve wireless performance, for example, by orchestrating one or more characteristics of different beacon frames (e.g., capabilities, offset, BSS color, etc.) usable by each collaboration workspace or session.

In some implementations, software 300 may include machine learning (ML) and/or artificial intelligence (AI) algorithms configured to collect context information such as, for example, RSSI from various APs, ToF from various APs, physical location information (e.g., by GPS), accelerometer data, etc. Software 300 may also include ML and/or AI algorithms configured to store and analyze other context information indicative of user behavior, such applications under execution and their priorities, distance between the user and the IHS, IHS posture or hinge angle, bag status, etc. Moreover, software 300 may be configured to use such information to perform beacon orchestration operations that are specific to a given context, for example, as prescribed by a beacon orchestration policy or the like.

Figure 4:
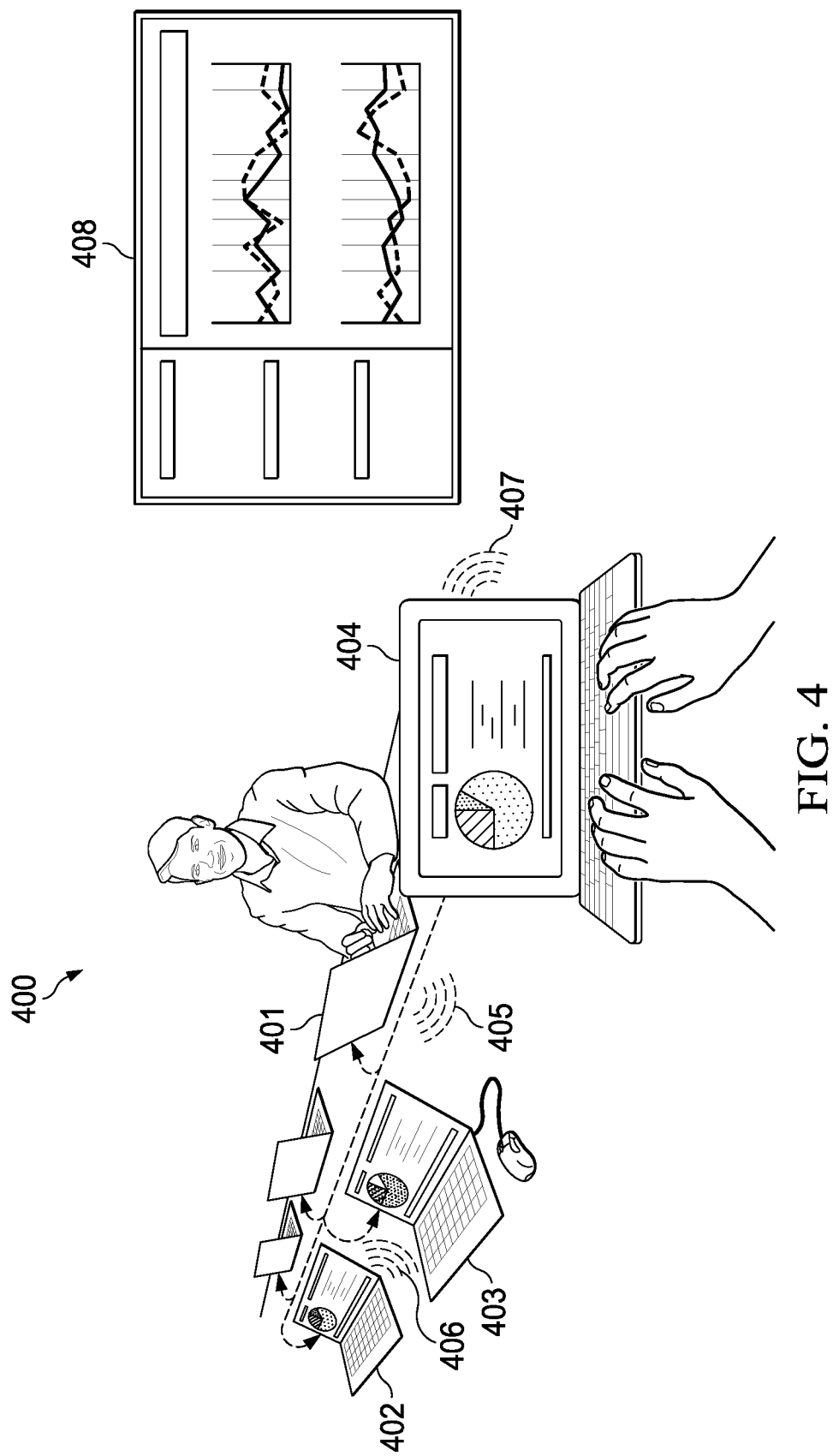
FIG. 4 is a diagram of a use-case example of beacon orchestration for concurrent collaboration sessions in P2P or mesh networks, according to some embodiments.

FIG. 4 is a diagram of a use-case example of beacon orchestration for concurrent collaboration sessions in P2P or mesh networks, according to some embodiments. In this example, collaboration room 400 may include a plurality of co-located IHSs 401-404 hosting two or more collaboration workspaces or sessions. In some cases, IHSs 401-404 in conference room 400 may have access to local area network 240 via AP 242 of FIG. 2.

As shown, IHS 401 may maintain first P2P network 405 open to IHSs 402-404 participating in a first collaboration application (e.g., audio fusion) executed during a first collaboration workspace or session. Second P2P network 406 may be used by a second collaboration application (e.g., file sharing) used in a second collaboration workspace or session between IHSs 402 and 403. Meanwhile, third P2P network 407 is used by a screen sharing application to display content from IHS 404 on external display 408 as part of a third collaboration workspace or session.

In this use-case, IHS 401 may act as the host of the first collaboration workspace or session, and it may execute an instantiation of MBTS 304 to orchestrate the transmission of beacon frames communicating the existence (and/or parameters) of first P2P network 405 to other co-located IHSs. IHS 402 may act as the host of the second collaboration workspace or session, and each of IHSs 402 and 403 may execute a respective instantiation of MBTS 304 to orchestrate the transmission of beacon frames communicating the existence (and/or parameters) of second P2P network 406 to other co-located IHSs. Meanwhile, IHS 404 may act as the host of the third collaboration workspace or session, and each of IHS 404 and display 408 may execute a respective instantiation of MBTS 304 to orchestrate the transmission of beacon frames communicating the existence (and/or parameters) of, third P2P network 407 to other co-located IHSs.

Figure 5:
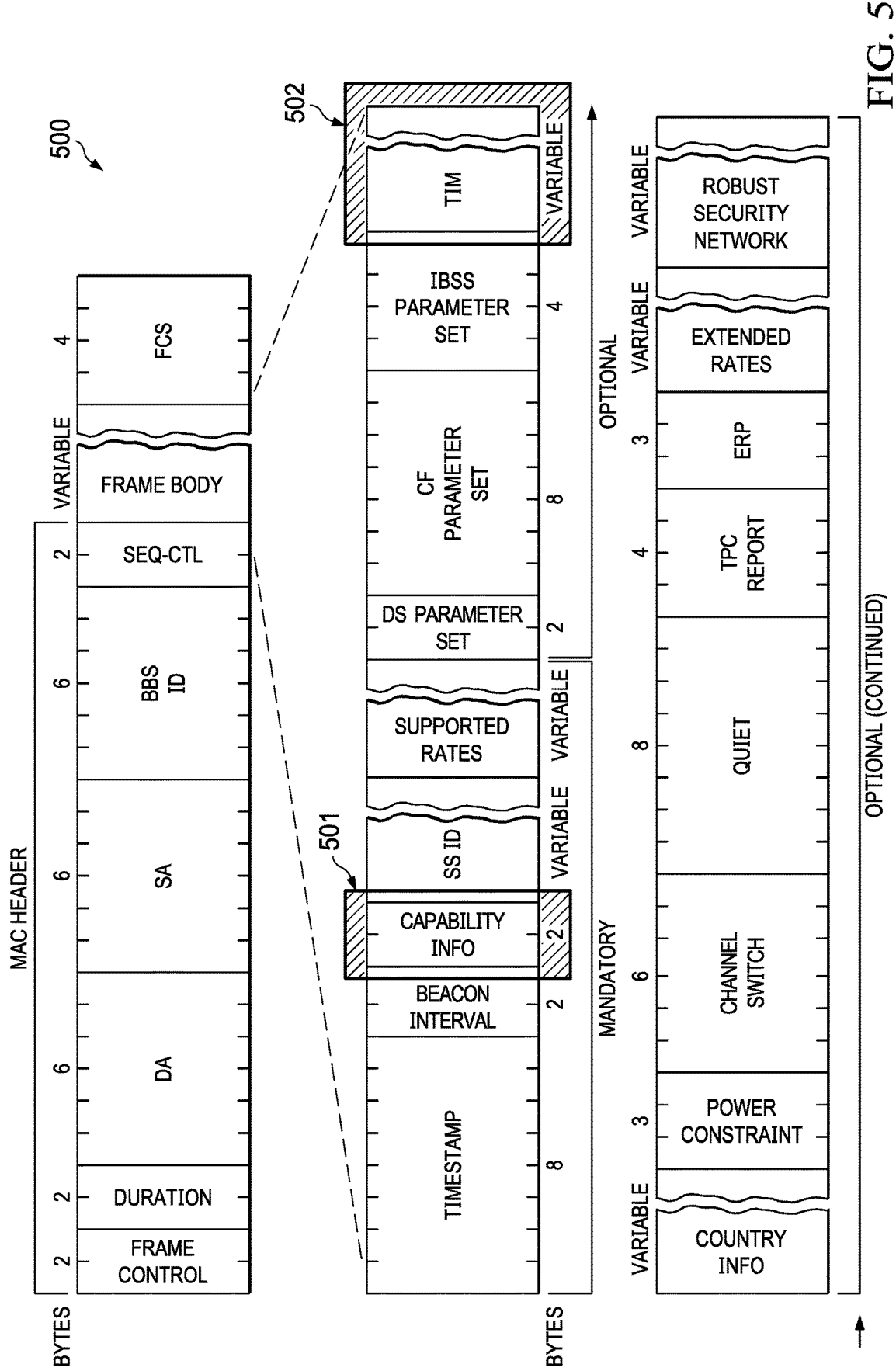
FIG. 5 is a diagram of an example of a beacon frame structure usable to implement beacon orchestration for concurrent collaboration sessions in P2P or mesh networks, according to some embodiments.

FIG. 5 is a diagram of an example of beacon frame structure 500 usable to implement beacon orchestration for concurrent collaboration sessions in P2P or mesh networks. In some embodiments, beacon frame 500 may be used by any of IHSs 210-230 in FIG. 2 and/or 401-404 in FIG. 4 (e.g., via network driver 307 of FIG. 3) to transmit and/or receive beacon frames. Moreover, beacon frames transmitted using structure 500 may be configured to facilitate the orchestration of concurrent collaboration sessions in P2P or mesh networks.

In some embodiments, IHS in a P2P or mesh network (e.g., 401-404 in FIG. 4) may transmit custom Wi-Fi beacon frames using structure 500 on a pre-configured Wi-Fi channel. These beacon frames may be used to manage various collaboration workspaces or sessions while avoiding collisions. In some cases, standard beacon frames may be used to add/remove IHS to various collaboration workspaces or sessions. Additionally, or alternatively, standard beacon frames may continue to be used by infrastructure nodes (e.g., AP 242) to maintain infrastructure connectivity in the same collaboration room.

As illustrated, beacon frame structure 500 comprises of an 802.11 header portion, a body portion, and a frame check sequence (FCS) portion. The body portion includes fields such as: timestamp, beacon interval, capability information 501, SSID, supported rates, frequency-hopping (FH) Parameter Set, Direct-Sequence (DS) Parameter Set, Contention-Free (CF) Parameter Set, IBSS Parameter Set, Traffic indication map (TIM) element 502, etc.

Capability information field 501 may span to 16 bits and it may contain information about capabilities of the IHS/network. Each IHS in a P2P or mesh network (e.g., 401-404 in FIG. 4) may be provided a unique n-bit UID in capability information field 501. In some cases, bit allocation for UID can be determined based on the number of devices or collaboration room context. The type of network, such as ad hoc (e.g., P2P, mesh, etc.) or infrastructure network (e.g., AP-based), may also be signaled in field 501. Additionally, or alternatively, capability information field 501 may carry information usable to configure the frequency of non-overlapping beacon messaging.

Figure 6:
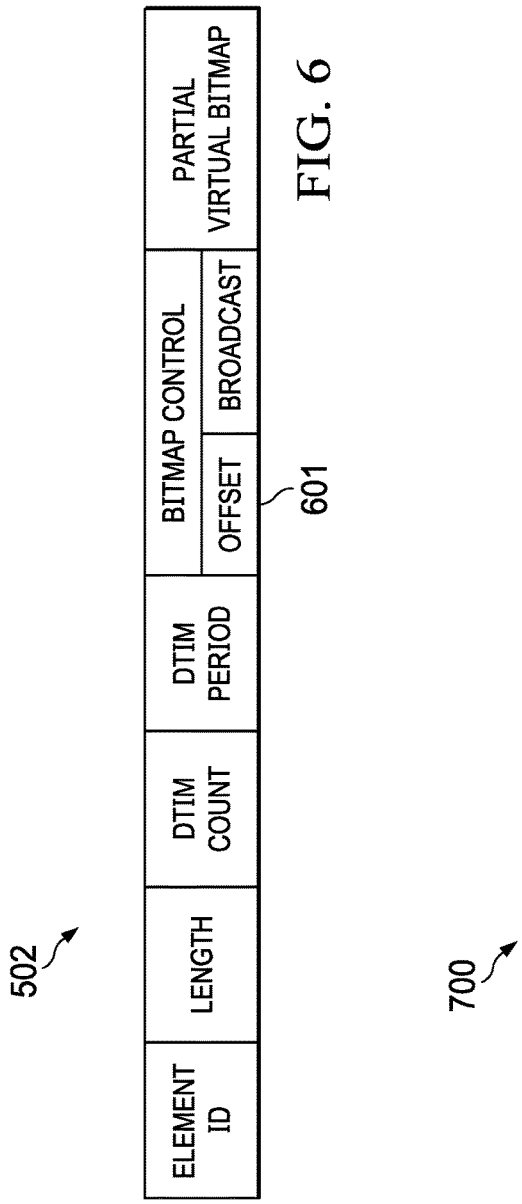
FIG. 6 is a diagram of an example of a Traffic Indication Map (TIM) element of a beacon frame usable to implement beacon orchestration for concurrent collaboration sessions in P2P or mesh networks, according to some embodiments.

TIM element 502 is shown FIG. 6, and it may include fields such as: element ID, length, DTIM count, DTIM period, bitmap control offset 601, bitmap control broadcast, and partial virtual bitmap. In some embodiments, TIM element 502 may be used to change a reference time-base for each IHS in the P2P or mesh network starting from the time a beacon frame is received, so that each IHS may be time-aligned with a host IHS. Particularly, this may be achieved by configuring bitmap control offset 601 bit.

Figure 7:
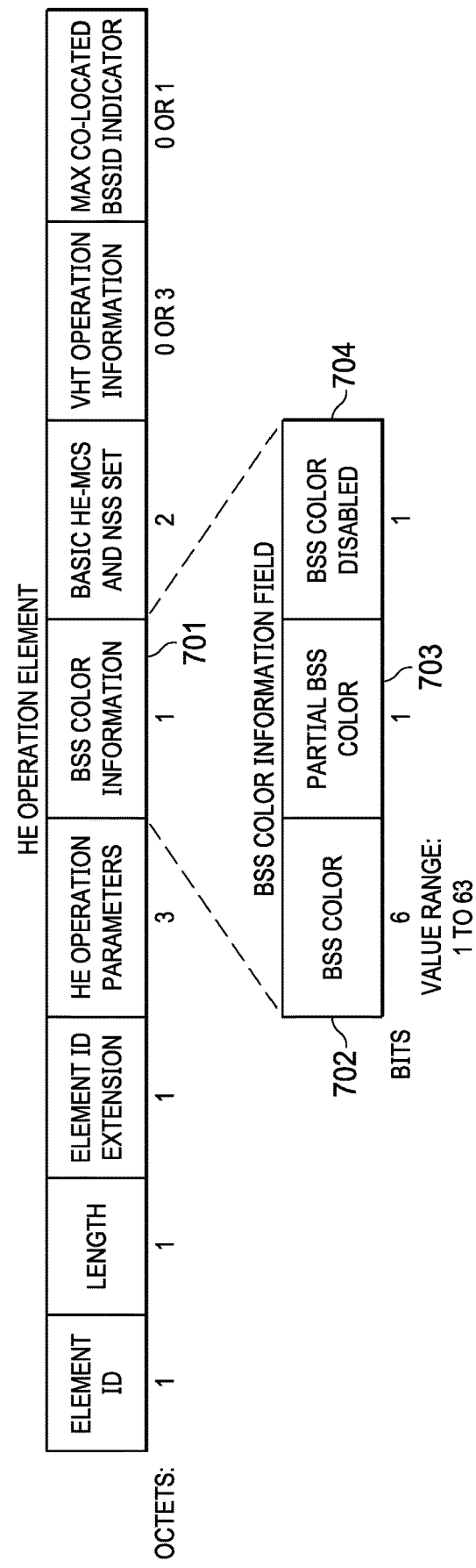
FIG. 7 is a diagram of an example of an HE Operation element of a beacon frame usable to implement beacon orchestration for concurrent collaboration sessions in P2P or mesh networks, according to some embodiments.

FIG. 7 is a diagram of an example of HE Operation element 700 of beacon frame structure 500 usable to implement beacon orchestration for concurrent collaboration sessions in P2P or mesh networks. In some embodiments, HE Operation element 700 may have a variety of fields, including Basic Service Set (BSS) color information field 701. BSS color information field 701 (1 octet) may in turn include BSS color field 702, partial BSS color field 703, and BSS color disabled field 704.

In some embodiments, BSS color information field 701 may be used to identify a P2P or mesh network. When a client IHS in a P2P or mesh network receives a beacon frame whose BSS color information field 701 identifies a BSS color different from the color of the client IHS's P2P or mesh network, that beacon frame can be ignored or discarded without parsing any other information. In some implementations, a 6-bit BSS color information field 701 may be sufficient to support multiple collaboration workspaces or sessions (e.g., each workspace or session supported by its own P2P network) in parallel.

In various embodiments, systems and methods described herein may enable beacon collision avoidance in a multi-P2P or mesh network collaboration environments by configuring and/or sequencing beacon frames, thus enabling a decentralized yet efficient spatial coordination of networked IHSs. Beacon frames transmitted and/or configured as described herein to facilitate the orchestration of concurrent collaboration sessions in P2P or mesh networks are referred to herein as Multi-Cast Collaboration Beacons (MCBs).

For sake of illustration, consider the implementation of FIG. 4 where host IHS 402 initiates P2P or mesh network 406 with client IHS 403 in collaboration room 400. Host IHS 402 may instantiate its MBTS service 304 when collaboration application 303 (e.g., audio fusion, etc.) is launched. Host IHS 402 may scan all beacon frames already present in collaboration room 400, including one or more MCBs. Each MCB may include information such as: collaboration UID, beacon time base, and beacon interval. Information from the beacon scan may be parsed to determine: (a) if there are any pre-existing MCBs in the workspace or collaboration environment; and/or (b) configuration of pre-existing MCBs.

Aggregated MBTS service 304 characteristics in MCBs may be analyzed to schedule non-overlapping beacon sequence for each IHS. Specifically, capability information provides information about the characteristics of a given IHS, for example, usable to distinguish a dedicated speakerphone or external display from a laptop computer. Non-overlapping beacons may be configured by scaling the beacon interval using bitmap offset 601. BSS Color 701 may be configured to uniquely identify the MCB for the corresponding P2P network in collaboration room 400.

MCBs may be configured by MBTS service 304 on a chosen frequency channel mapped to a corresponding collaboration UID. Multiple frequency channels may be chosen for a collaboration ID, for example, when multiple P2P sessions of same type are expected in collaboration room 400. Host IHS 402 may update the P2P or mesh network's beacons with MBTS information, and client IHS 404 may follow an incremental scan on the chosen frequency channels.

An example of incremental scan code may be as follows:

| | |
|---|---|
| 1: | function INCREMENTALSCAN |
| 2: | result ← { } |
| 3: | for each channel ∈ channelSequence do |
| 4: | result ← result ∪ scan(channel) |
| | > break if CollabUID have been found |
| 5: | if \|result\| ≥ α then |
| 6: | break |
| 7: | end if |
| 8: | if similar (result, previous) then |
| 9: | Proceed to previous channel |
| 10: | result ← result ∪ scan(channel) |
| found | break if CollabUID have been |
| 11: | end if |
| 12: | end for |
| CollabUID | > Proceed with Channel sequence for |
| 13: | ChannelSequence ← sortChannels(result) |
| 14: | previous ← results |
| 15: | return result |
| 16: | end function |

Particularly, client IHS 403 may instantiate its own MBTS service 304 to configure a beacon scanning procedure based on a collaboration UID and information received in any MCBs. Client IHS 403 scans for beacon frames on the chosen frequency channel for the collaboration UID for which a P2P session is initiated. In cases where multiple P2P sessions for the same collaboration UID are expected, an incremental scan procedure may be selected where client IHS 403 cycles through only a few chosen frequency channels, thus avoiding the need to cycle through other frequency channels.

Client IHS 403 time aligns with host IHS 402's beacons using the information obtained from its MCB. Client IHS 403 may also select a BSS color of interest for the underlying workspace MCB. All beacon frames that lack a matching BSS color 701 may be rejected without parsing the beacon. In some cases, even when BSS color 701 matches, client IHS 403 may still reject the beacon based on context information (e.g., if a screen sharing workspace or session is in progress and data is being received, a beacon may no longer be necessary). When client IHS 403 is part of multiple P2P networks of same type, the scan-rate of client IHS 403 may be configured to be a selected number of times faster (e.g., 2×, 4×) than the time-aligned beacon rate of the underlying P2P or mesh network.

Figure 8A:
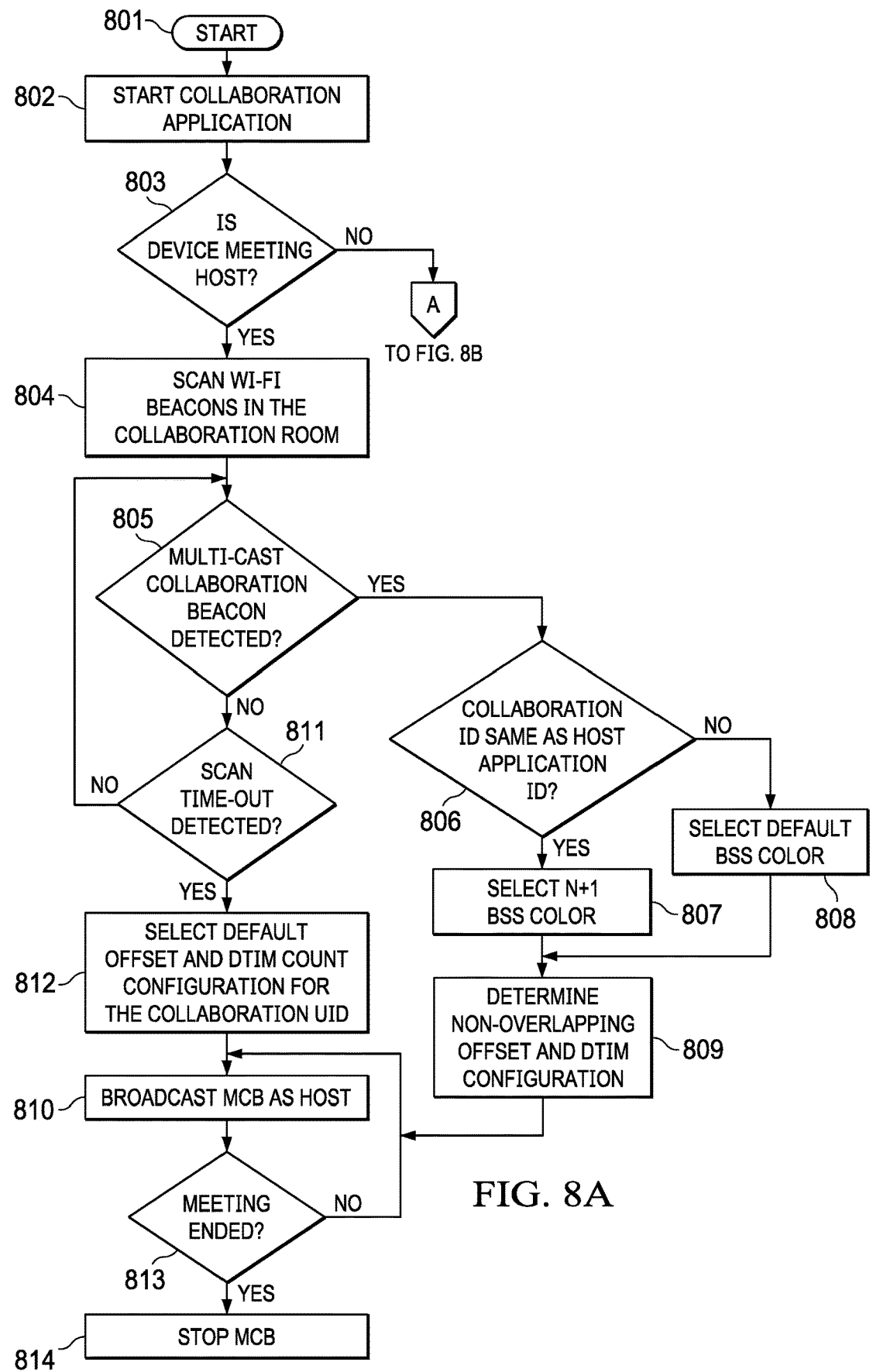
FIGS. 8A-C are a flowchart of an example of a method for beacon orchestration for concurrent collaboration sessions in P2P or mesh networks, according to some embodiments.
Figure 8B:
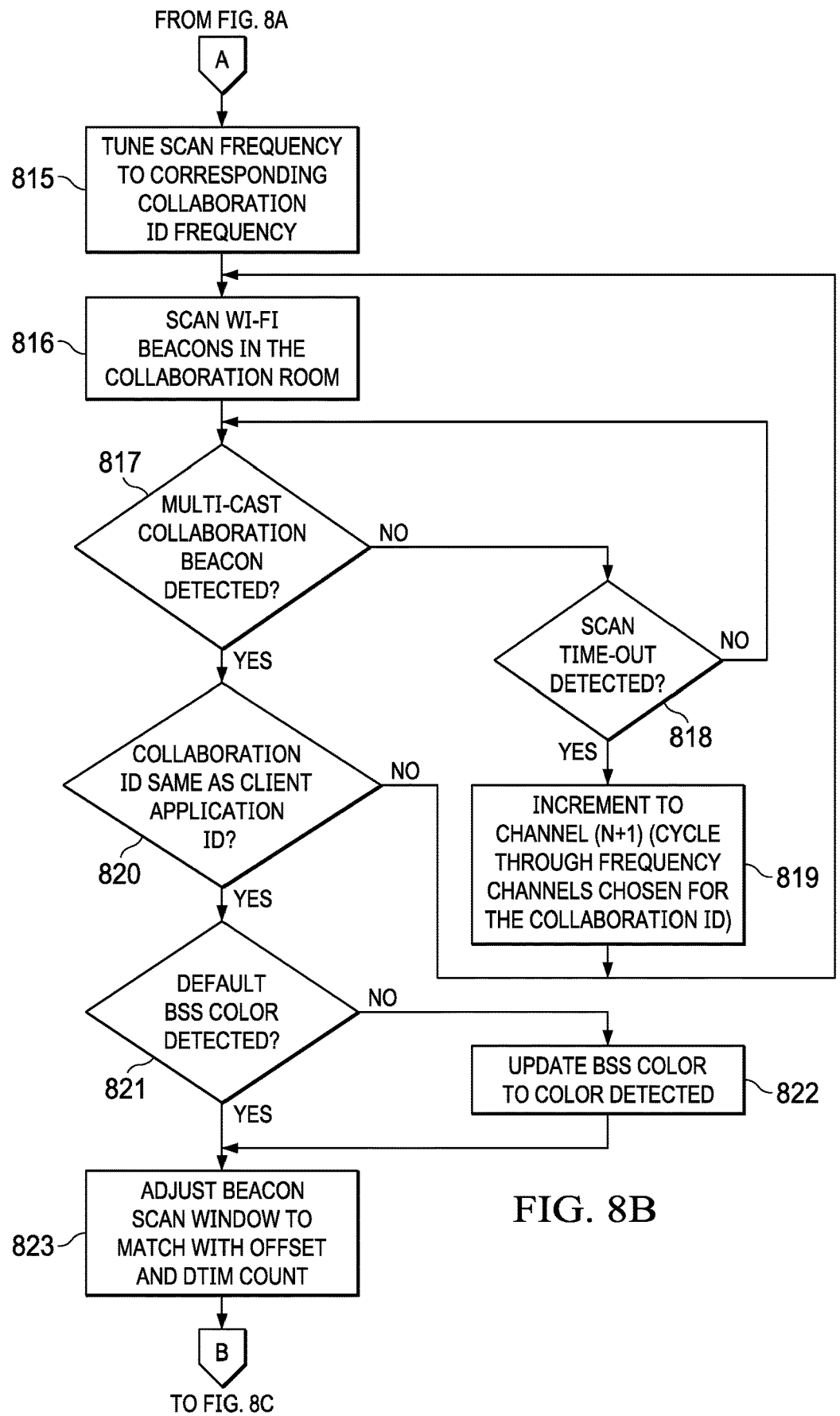
Figure 8C:
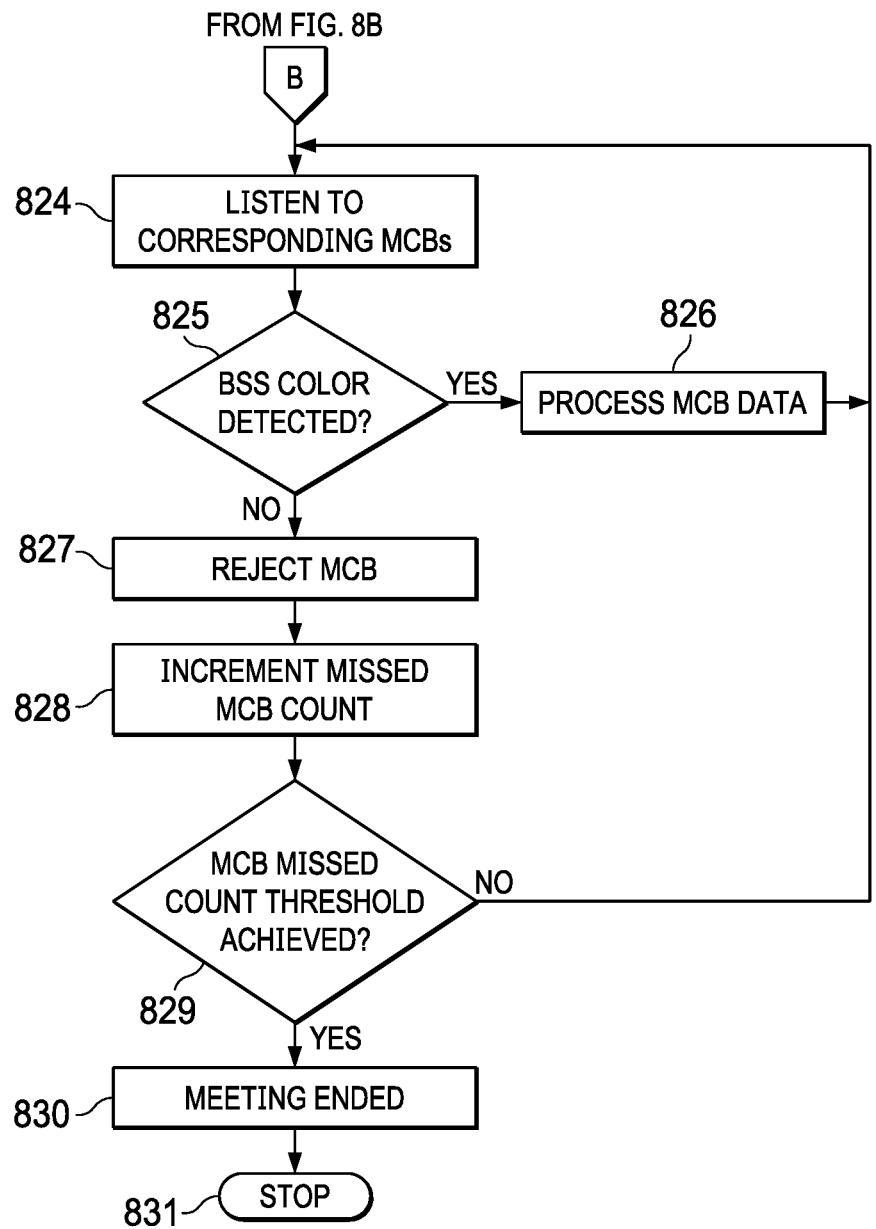

FIGS. 8A-C combined show a flowchart of an example of method 800 for beacon orchestration for concurrent collaboration sessions in P2P or mesh networks. In method 800, a host IHS may configure one or more non-overlapping MCBs. MCBs may be configured on a specific channel such that they do not interfere with beacons from other concurrent P2P or mesh sessions in the same room. A client IHS may follow an incremental scan procedure to detect MCBs, where BSS color may be used to detect/reject the host message using the preamble information without the need to otherwise process the message.

In some embodiments, method 800 may be performed, at least in part, by IHS 100 executing software 300 in collaboration room 400 where at least a portion of network environment 200 is available. Particularly, method 800 starts at 801. At 802, IHS 100 starts collaboration application 303. At

803, IHS 100 determines whether it is a host or client device with respect to a collaboration workspace or session hosting collaboration application 303.

If IHS 100 is a host IHS, at 804 it scans Wi-Fi beacons in the collaboration room. At 805, method 800 determines whether an MCB beacon is detected. If so, at 806 method 800 determines whether the collaboration UID of the detected MCB matches a host collaboration application ID. If so, block 807 selects an "n+1" BSS color; otherwise block 808 selects a default BSS color. At 809, method 800 determines non-overlapping bitmap offset(s) and DTIM configuration parameters before control passes to 810.

At 811, if an MCB beacon is not detected, method 800 determines if a scan time-out is detected. If not, control returns to 805. Otherwise, at 812, method 800 selects a default bitmap offset and DTIM count configuration for the collaboration UID. At 810, the host IHS broadcasts an MCB including beacon frame elements discussed above. At 813, if the workspace, session, or meeting has not yet ended, control returns to 810. Otherwise, at 814, method 800 stops transmitting the MCB.

Returning to 803, if IHS 100 is a client IHS, at 815 method 800 tunes its scan frequency to a corresponding collaboration ID frequency. For example, Table I below illustrates examples of collaboration ID frequencies:

TABLE I

| Collaboration ID | DTIM Offset | MCB Channel | Application Example |
|---|---|---|---|
| 0x00 | 1 | 100 | Audio Fusion |
| 0x01 | 2 | 124 | Screen Sharing |
| 0x10 | 3 | 157 | File Transfer |

At 816, method 800 scans Wi-Fi beacons in the collaboration room. At 817, method 800 determines whether an MCB is detected. If an MCB is not detected, at 818 method 800 determines whether a scan time-out has been detected. If not, control returns to 817. If so, at 819 method 800 increments to channel (n+1) by cycling through frequency channels chosen for the collaboration UID, and control returns to 816.

If at 817 method 800 detects an MCB, then at 820 method 800 determines whether the collaboration UID matches a client collaboration application ID. If not, control returns to block 816. If so, at 821, method 800 determines whether a default BSS color is detected. If not, at 822, method 800 updates the BSS color to the detected color. If so, at 823, method 800 adjusts a beacon scan window to match the bitmap offset and DTIM count.

At 824, method 800 listens for corresponding MCBs. At 825, method 800 determines is another BSS color is detected. If so, 826 processes the MCB data and control returns to block 824. Otherwise, at 827, method 800 rejects the MCB and at 828 method 800 increments a missed MCB count. At 829, method 800 determines whether an MCB missed count has been reached. If not, control returns to 824. If so, the workspace, session, or meeting ends at 830, and method 800 stops at 831.

In some cases, method 800 may be scalable and adjustable based upon design/workspace definition needs. The same setup/configuration procedure of method 800 may be followed for each P2P or mesh session in collaboration room 400, for example.

FIG. 9 shows an example of implementation 900 of systems and methods for beacon orchestration for concurrent collaboration sessions in P2P or mesh networks. Particularly, implementation 900 describes the transmission of MCBs by three co-located host IHSs 910, 920, and 930, each configured to perform method 800 of FIGS. 8A-C.

First MCB 911 transmitted by first IHS 910 is configured at first primary offset 913 from infrastructure beacons 901 (having interval 902 between them) using the beacon frame's configuration fields DTIM offset and count for a first collaboration UID. Particularly, a first DTIM offset field defines first offset 913 (offset=0) from infrastructure beacon 901, and a first DTIM count field (DTIM count=2) defines after how many infrastructure beacons 911 a subsequent first MCB 911 will be transmitted. A first BSS color may be selected based on collaboration UID (BSS color=0b0) using Table I above.

Second MCB 921 transmitted by second IHS 920 is configured at second primary offset 923 from infrastructure beacons 901 using the beacon frame's configuration fields DTIM offset and count for a second collaboration UID. Particularly, a second DTIM offset field defines second offset 923 (offset=1) from infrastructure beacon 901, and a second DTIM count field (DTIM count=2) defines after how many infrastructure beacons 901 a subsequent second MCB 921 will be transmitted. A second BSS color may be selected based on collaboration UID (BSS color=0b000010) using Table I above.

Third MCB 931 transmitted by third IHS 930 is configured at third primary offset 923 from infrastructure beacons 901 using the beacon frame's configuration fields DTIM offset and count for a third collaboration UID. Particularly, a third DTIM offset field defines second offset 933 (offset=2) from infrastructure beacon 901, and a third DTIM count field (DTIM count=3) defines after how many infrastructure beacons 901 a subsequent third MCB 931 will be transmitted. A third BSS color may be selected based on collaboration UID (BSS color=0b100000) using Table I above.

Figure 10:
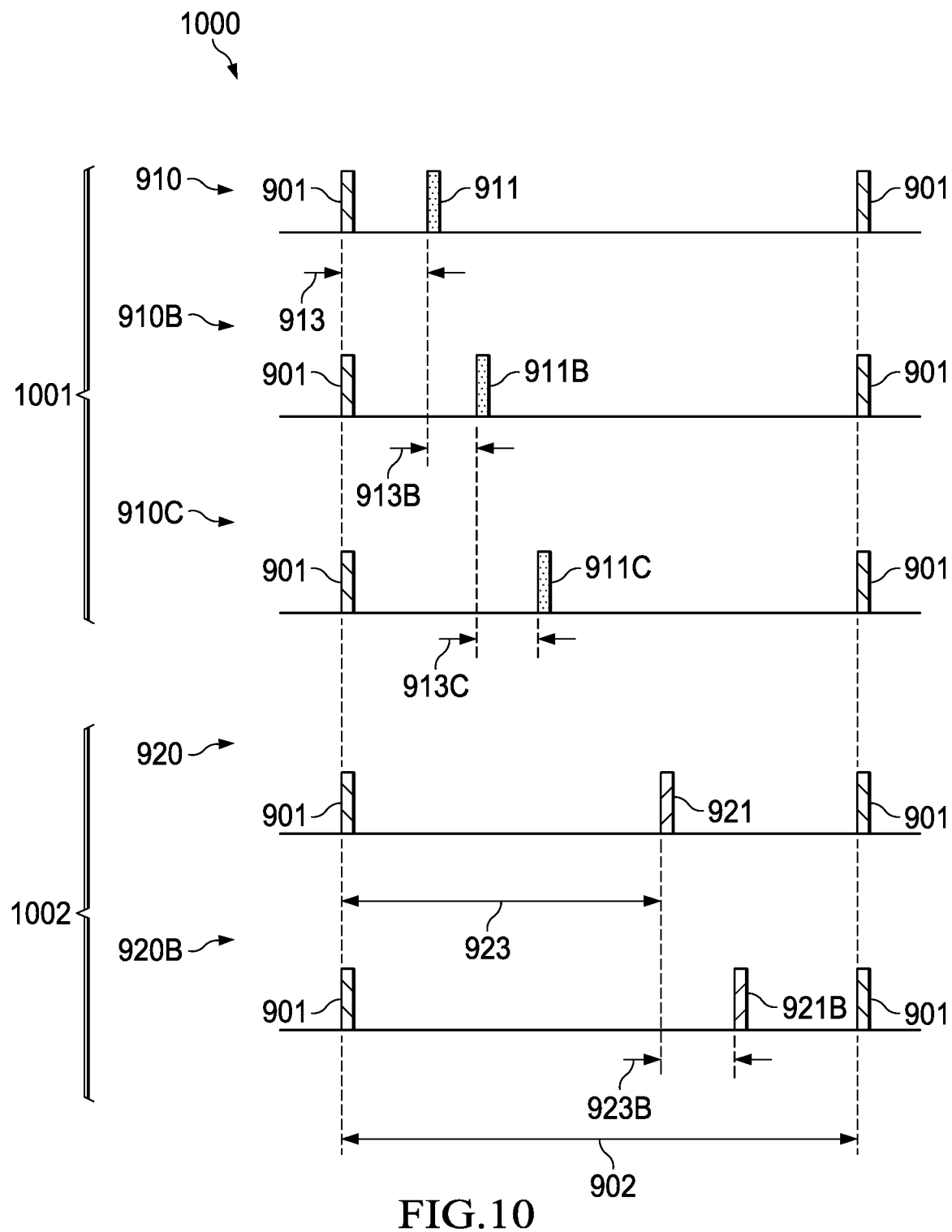
FIG. 10 shows an example of another implementation of systems and methods for beacon orchestration for concurrent collaboration sessions in P2P or mesh networks, according to some embodiments.

FIG. 10 shows an example of another implementation 1000 of systems and methods for beacon orchestration for concurrent collaboration sessions in P2P or mesh networks. Particularly, implementation 1000 describes the transmission of MCBs by two sets of IHSs 1001 and 1002 participating in concurrent collaboration workspaces or sessions, such that the IHSs in each group are configured to perform method 800 of FIGS. 8A-C.

In IHS set 1001, a first P2P or mesh network where a first collaboration workspace or session takes place comprises first host IHS 910, client IHS 910B, and client IHS 910C. First host IHS 910 transmits MCB 911 with first primary offset 913 from infrastructure beacon 901, client IHS 910B transmits MCB 911B with first secondary offset 913B from MCB 911 and/or infrastructure beacon 901, and client IHS 910C transmits MCB 911C with second secondary offset 913C from MCB 911B, MCB 911, and/or infrastructure beacon 901.

In some cases, a difference between first secondary bitmap offset 913B and first primary bitmap offset 911, for example, may be selected based upon contextual information. The contextual information may include, for instance, a number of IHSs participating in the collaboration session, an identification of the collaboration session, a priority of the collaboration session, or a level of service required or requested by the collaboration session. Additionally, or alternatively, the contextual information may include at least one of: a distance of a user to the IHS, a location of the IHS, or a posture of the IHS.

During the first collaboration session, in response to the distance being a first distance, the location being a first location, and/or the posture being a first posture, the difference between first secondary bitmap offset 913B and first primary bitmap offset 911 may be reduced. Still during the first collaboration session, in response to the distance being a second distance, the location being a second location, and/or the posture being a second posture, the difference between first secondary bitmap offset 913B and first primary bitmap offset 911 may be increased.

In IHS set 1002, a second P2P or mesh network where a second collaboration workspace or session takes place comprises second host IHS 920 and client IHS 920B. Second host IHS 920 transmits MCB 920 with second primary offset 923 from infrastructure beacon 901, and client IHS 920B transmits MCB 921B with second secondary offset 923B from MCB 921 and/or infrastructure beacon 901.

Accordingly, systems and methods described herein may enable collaboration room meeting management using de-centralized beacon transmission scheduling techniques for collision avoidance and multi-cast collaboration beacon for multiple simultaneous or concurrent P2P Wi-Fi mesh networks. These systems and methods may provide fast and efficient beacon procedure setup using BSS color, avoiding the need to parse the complete beacon for setup or continued session control, as well as energy efficiencies associated with incremental scans and reduced setup time for P2P or mesh connection mechanisms. For example, each IHS may select new frequency channels for its MCBs in the 6 GHz band.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A first Information Handling System (IHS), comprising:
   a processor; and
   a memory coupled to the processor, the memory having program instructions stored thereon that, upon execution, cause the first IHS to:
   detect a first multicast collaboration beacon (MCB) in a peer-to-peer (P2P) or mesh network comprising at least a second IHS and a third IHS;
   identify a first collaboration session between at least the second IHS and the third IHSs based upon the first MCB; and
   transmit a second MCB in the P2P or mesh network, configured, based at least in part upon the first MCB, to orchestrate a second collaboration session, different than the first collaboration session, in the P2P or mesh network between the first IHS and one or more other IHSs other than either the second IHS or the third IHS;
   wherein the first MCB comprises a first bitmap offset in a first Traffic Indication Map (TIM), and wherein the second MCB comprises a second bitmap offset in a second TIM, and
   wherein a difference between the second bitmap offset and the first bitmap offset is selected based upon contextual information comprising at least one of: a proximity of a user to the IHS, a location of the IHS, or a posture of the IHS.

2. The first IHS of claim 1, wherein the first MCB comprises first capability information associated with at least one of the second IHS or the third IHS, and wherein the second MCB comprises second capability information associated with at least the first IHS.

3. The first IHS of claim 1, wherein the second bitmap offset is greater than the first bitmap offset.

4. The first IHS of claim 1, wherein the contextual information comprises at least one of: a number of collaboration sessions; a number of IHSs participating in a given collaboration session, an identification of an application used during the given collaboration session, a priority of the given collaboration session, or a level of service required or requested by the given collaboration session.

5. The first IHS of claim 1, wherein the first MCB is received over a first communication channel associated with a first collaboration session identification, and wherein the second MCB is configured to be transmitted over a second communication channel selected based upon a second collaboration session identification.

6. The first IHS of claim 5, wherein a second frequency of the second communication channel is higher than a first frequency of the first communication channel.

7. The first IHS of claim 5, wherein the first MCB comprises a first Basic Service Set (BSS) color indication selected based upon the first collaboration session identification, and wherein the second MCB comprises a second BSS color indication selected based upon the second collaboration session identification.

8. The first IHS of claim 1, wherein each of the first and second collaboration sessions comprises execution of at least one of: an audio fusion application or service; or a screen share application or service.

9. The first IHS of claim 1, wherein the second MCB is configured to, upon receipt by a fourth IHS, enable the fourth IHS to join the second collaboration session with the first IHS in the P2P or mesh network.

10. The first IHS of claim 1, wherein the second MCB is configured to, upon receipt by a fourth IHS, enable the fourth IHS to broadcast a third MCB configured to orchestrate the second collaboration session in the P2P or mesh network.

11. The first IHS of claim 10, wherein the first MCB comprises a first primary bitmap offset in a first Traffic Indication Map (TIM), wherein the second MCB comprises a second primary bitmap offset in a second TIM, wherein the third MCB comprises a first secondary bitmap offset in another TIM, and wherein the first secondary bitmap offset has a value between the first and second primary bitmap offsets.

12. The first IHS of claim 11, wherein a difference between the first secondary bitmap offset and the first primary bitmap offset is selected based upon contextual information.

13. The first IHS of claim 12, wherein the contextual information comprises at least one of: a number of IHSs participating in the second collaboration session, an identification of the second collaboration session, a priority of the second collaboration session, or a level of service required or requested by the second collaboration session.

14. The first IHS of claim 12, wherein the contextual information comprises at least one of: a distance of a user to the IHS, a location of the IHS, or a posture of the IHS.

15. The first IHS of claim 14, wherein the program instructions, upon execution, further cause the IHS to:
reduce the difference in response to at least one of: the distance being a first distance, the location being a first location, or the posture being a first posture; or
increase the difference in response to at least one of: the distance being a second distance, the location being a second location, or the posture being a second posture.

16. A memory device having program instructions stored thereon that, upon execution by a processor of an Information Handling System (IHS), cause the IHS to:
receive, by a multi-beacon transmission scheduling (MBTS) service, a plurality of multicast collaboration beacons (MCBs) in a peer-to-peer (P2P) or mesh network, each MCB of the plurality of received MCBs associated with a different one of a plurality of collaboration sessions of the P2P or mesh network;
identify, by the MBTS service based upon a first MCB of the plurality of received MCBs, an identification of an application used in a first collaboration session of the plurality of collaboration sessions of the P2P or mesh network; and
joining the first collaboration session of the plurality of collaboration sessions of the P2P or mesh network based, at least in part, on the identification of the application used in the first collaboration session;
wherein the first MCB comprises a first bitmap offset in a first Traffic Indication Map (TIM), and wherein a second MCB comprises a second bitmap offset in a second TIM, and
wherein a difference between the second bitmap offset and the first bitmap offset is selected based upon contextual information comprising at least one of: a proximity of a user to the IHS, a location of the IHS, or a posture of the IHS.

17. A method, comprising:
receiving a plurality of multicast collaboration beacons (MCBs) broadcast in a peer-to-peer (P2P) or mesh network, each MCB of the plurality of received MCBs associated with a different one of a plurality of collaboration sessions of the P2P or mesh network; and
joining a selected one of the plurality of collaboration sessions of the P2P or mesh network using a Basic Service Set (BSS) color indication contained in at least one of the plurality of MCBs broadcast in the P2P or mesh network;
wherein a first MCB comprises a first bitmap offset in a first Traffic Indication Map (TIM) and wherein a second MCB comprises a second bitmap offset in a second TIM, the first MCB received over a first communication channel associated with a first collaboration session identification, and the second MCB configured to be transmitted over a second communication channel selected based upon a second collaboration session identification; and
wherein the first MCB comprises a first Basic Service Set (BSS) color indication selected based upon the first collaboration session identification and the second MCB comprises a second BSS color indication selected based upon the second collaboration session identification.

* * * * *